(12) United States Patent
Li

(10) Patent No.: US 7,814,344 B2
(45) Date of Patent: Oct. 12, 2010

(54) SYSTEM AND METHOD FOR POWER CONTROL FOR ASIC DEVICE

(75) Inventor: Henry S. Li, Shanghai (CN)

(73) Assignee: Semiconductor Manufacturing International (Shanghai) Corporation, Shanghai (CN)

(*) Notice: Subject to any disclaimer, the term of this patent is extended or adjusted under 35 U.S.C. 154(b) by 859 days.

(21) Appl. No.: 11/624,691

(22) Filed: Jan. 18, 2007

(65) Prior Publication Data
US 2007/0285137 A1   Dec. 13, 2007

(30) Foreign Application Priority Data
Jun. 12, 2006   (CN) .................. 2006 1 0027590

(51) Int. Cl.
G06F 1/00 (2006.01)
H03L 7/00 (2006.01)

(52) U.S. Cl. .................... 713/300; 327/143

(58) Field of Classification Search .......... 713/300
See application file for complete search history.

(56) References Cited

U.S. PATENT DOCUMENTS

| | | | |
|---|---|---|---|
| 5,367,638 A * | 11/1994 | Niessen et al. ............. 710/57 |
| 5,452,401 A * | 9/1995 | Lin ............................ 713/322 |
| 6,195,755 B1 * | 2/2001 | Webster et al. ............. 713/330 |
| 6,647,502 B1 * | 11/2003 | Ohmori ...................... 713/322 |
| 6,865,653 B2 * | 3/2005 | Zaccarin et al. ............ 711/154 |
| 7,437,582 B1 * | 10/2008 | Parlour ....................... 713/320 |
| 2007/0226462 A1 * | 9/2007 | Scott et al. ................. 712/207 |

* cited by examiner

Primary Examiner—Thomas Lee
Assistant Examiner—Brandon Kinsey
(74) Attorney, Agent, or Firm—Townsend and Townsend and Crew LLP

(57) ABSTRACT

A system and method for power control for ASIC device is disclosed. According to an embodiment, the present invention provides a system for adjusting power consumption of an ASIC device. The system includes a first buffer. The first buffer is configured to receive and store data. The system also includes a controller that is configured to generate a control signal. The controller is coupled to the first buffer. The system additionally includes a processing unit coupled to the first buffer. The processing unit includes a first power source and a second power source. The first power source is different from the second power source. The processing unit is configured to receive the control signal from the controller. Additionally, the system includes a second buffer coupled to the processing unit. The second buffer is configured to receive and store processed data.

24 Claims, 4 Drawing Sheets

SYSTEM AND METHOD FOR POWER CONTROL FOR ASIC DEVICE

CROSS-REFERENCES TO RELATED APPLICATIONS

This application claims priority to Chinese Application No. 200610027590.2; filed on Jun. 12, 2006; commonly assigned, and of which is hereby incorporated by reference for all purposes.

BACKGROUND OF THE INVENTION

The present invention is directed to integrated circuits. More particularly, the invention provides a power saving system and method for application specific integrated circuit (ASIC) devices. Merely by way of example, the invention has been applied to very large scale integration (VLSI) chips that include ASIC circuits. But it would be recognized that the invention has a much broader range of applicability.

Integrated circuits or "ICs" have evolved from a handful of interconnected devices fabricated on a single chip of silicon to millions of devices. Current ICs provide performance and complexity far beyond what was originally imagined. In order to achieve improvements in complexity and circuit density (i.e., the number of devices capable of being packed onto a given chip area), the size of the smallest device feature, also known as the device "geometry", has become smaller with each generation of ICs. Semiconductor devices are now being fabricated with features less than a quarter of a micron across.

Increasing circuit density has not only improved the complexity and performance of ICs but has also provided lower cost parts to the consumer. An IC fabrication facility can cost hundreds of millions, or even billions, of dollars. Each fabrication facility will have a certain throughput of wafers, and each wafer will have a certain number of ICs on it. Therefore, by making the individual devices of an IC smaller, more devices may be fabricated on each wafer, thus increasing the output of the fabrication facility. Making devices smaller is very challenging, as a given process, device layout, and/or system design often work down to only a certain feature size.

Integrated circuits have a variety of applications. For example, ASIC is a type of chip that has been produced for particular application. For example, ASIC have been designed and use for cellular telephones. Generally, feature, size, and power consumption of ASIC devices important characteristics. Excessive power consumption is typically an undesirable characteristic. Excessive power consumption not only causes high energy costs, but also can generate a significant amount of heat that adversely affects device performance and even damages device components if proper protective measures are not adopted.

In the past, various techniques have been used to reduce power consumption for ASIC circuits. For example, dynamic variable power-supply (DVP) system has been a conventional techniques used to reduce power consumption. Unfortunately, conventional techniques such as the DVP system are often inadequate.

From the above, it is desirable to have an improved technique for power control of ASIC devices.

BRIEF SUMMARY OF THE INVENTION

The present invention is directed to integrated circuits. More particularly, the invention provides a power saving system and method for application specific integrated circuit (ASIC) devices. Merely by way of example, the invention has been applied to very large scale integration (VLSI) chips that include ASIC circuits. But it would be recognized that the invention has a much broader range of applicability.

According to an embodiment, the present invention provides a system for adjusting power consumption of an ASIC device. The system includes a first buffer (e.g., the first buffer is implemented with random access memory and control logic). The first buffer is configured to receive and store data. The system also includes a controller that is configured to generate a control signal. The controller is coupled to the first buffer. The system additionally includes a processing unit coupled to the first buffer. The processing unit includes a first power source and a second power source. The first power source is different from the second power source. The processing unit is configured to receive the control signal from the controller. Additionally, the system includes a second buffer coupled to the processing unit. The second buffer is configured to receive and store processed data. The controller is further configured to process information associated at least with the first buffer level and a first predetermined buffer level. If the first buffer level is higher than the first predetermined buffer level, the control signal represents a first power source signal. Alternatively, if the first buffer level is not higher than a first predetermined buffer level, the control signal represents a second power source signal. The processing unit is further configured to operate with the first power source if the control signal represents the first power signal, and to operate with the second power source if the control signal represents the second power signal. The first power source is associated with a first power consumption level. The second power source is associated with a second power consumption level.

According to another embodiment, the present invention provides a method for adjusting power consumption of an ASIC device. The method includes step for receiving and storing data. The data is characterized by a first condition (e.g., buffer level, data rate, etc.). The method also includes a step for generating a control signal. The control signal is associated with the first condition. The method additionally includes a step for selecting a power consumption level based on the control signal. Additionally, the method includes a step for processing the data at the selected power consumption level. In addition, the method includes a step for outputting the processed data. The step for generating a control signal further includes a step for processing information associated with the first condition and a predetermined condition. If the first condition is higher than the predetermined condition, the control signal represents a first power level. If the first condition is not higher than the predetermined condition, the control signal presents a second power level. The step of selecting a power consumption level includes a step selecting a first power consumption level if the control signal represents a first power level, and selecting a second power consumption level if the control signal indicates a second power level. The first power consumption level is higher than the second power consumption level.

According to yet another embodiment, the present invention provides a method for adjusting power consumption of an ASIC device. The method includes a step for receiving and storing data. The data is characterized by a first condition. The method also includes a step for generating a control signal. The control signal is associated with the first condition. The method further includes a step for selecting a processing unit based on the control signal. The method additionally includes a step for processing the data using the selected processing unit. Additionally, the method includes a step for outputting the processed data. The step of generating a control signal further includes a step for processing information associated with the first condition and a predetermined condition. If the first condition satisfies the predetermined condition, the control signal represents a first power level. If the first condition does not satisfy the predetermined condition, the control signal presents a second power level. The step for selecting a power consumption level includes a step for selecting a first processing unit if the control signal represents a first power level, and selecting a second processing unit if the control signal indicates a second power level. The first processing unit is different from the second processing unit.

According to yet another embodiment, the present invention provides a system for adjusting power consumption of an ASIC device. The system includes a first buffer, which configured to receive and store data. The data is characterized by a first condition. The system further includes a controller configured to generate a control signal. The control signal is coupled to the first buffer. The system also includes a processing unit coupled to the first buffer. The processing unit including a first power source and a second power source, the first power source being different from the second power source, the processing unit being configured to receive the control signal from the controller. The system additionally includes a second buffer coupled to the processing unit. The second buffer is configured to receive and store processed data. The controller is further configured to process information associated at least with the first condition, a first predetermine condition, and a second predetermined condition. If the first condition satisfies the first predetermined condition, the control signal represents a first power source signal. If the second condition satisfies the second predetermined condition, the control signal represents a first power source signal. The processing unit is further configured to operate with the first power source if the control signal represents the first power signal, and to operate with the second power source if the control signal represents the second power signal. The first power source is associated with a first power consumption level. The second power source is associated with a second power consumption level. The first predetermined condition is different from the second predetermined condition.

It is to be appreciated that the present invention provides an improved system and method for providing power for ASIC devices. According to certain embodiments, the present invention reduces power consumption and improves power efficiency for ASIC devices. Depending upon application, the present invention also provides better flexibility for power control and implementation.

The present invention provides various advantages. Some embodiments of the present invention provide a system and method for reducing power consumption. Depending upon application, the present lowers power consumption and prolongs battery usage for portable devices that utilize ASIC devices. For certain applications, the present invention lowers heat dissipation by adjusting power used by ASIC devices. For example, low power is used when ASIC devices is not busy. Certain embodiments of the present invention utilize a controller to provide control signal for adjusting the operation power of ASIC devices.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention is directed to integrated circuits. More particularly, the invention provides a power saving system and method for application specific integrated circuit (ASIC) devices. Merely by way of example, the invention has been applied to very large scale integration (VLSI) chips that include ASIC circuits. But it would be recognized that the invention has a much broader range of applicability.

In the past, various techniques have been used to reduce power consumption for ASIC circuits. For example, dynamic variable power-supply (DVP) system has been a conventional techniques used to reduce power consumption. Unfortunately, conventional techniques such as the DVP system are often inadequate.

Figure 1:
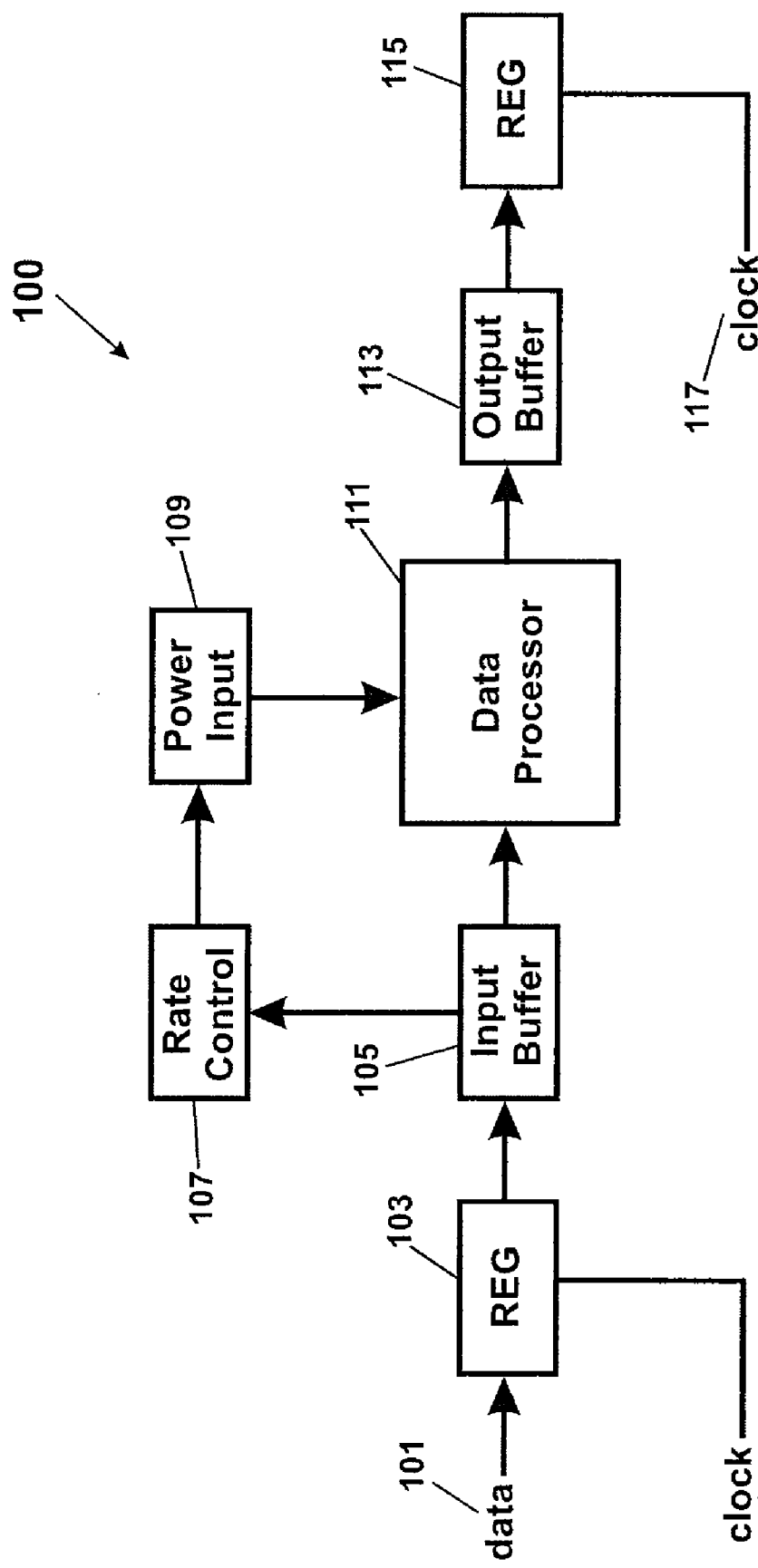
FIG. 1 is a simplified diagram illustrating a convention power-supply system for ASIC devices.

FIG. 1 is a simplified diagram illustrating a convention power-supply system for ASIC devices. This diagram is merely an example, which should not unduly limit the scope of the claims. One of ordinary skill in the art would recognize many variations, alternatives, and modifications. A system 100 includes the following components:

1. data source 101;
2. register 103;
3. clock 102;
4. input buffer 105;
5. rate control 107;
6. power input 109;
7. data processor 111;
8. output buffer 113;
9. register 115; and
10. clock 117

Typically, the data comes in from the data source 101. The register 103 receives data in a synchronous fashion based on the signals from the clock 102. The received data that is stored at the register 103 is then transferred to the input buffer 105. The input buffer 105 is connected to the rate control 107. The rate control 107 is connected to the power input 109. For example, the power input 109 is a DC power source or DC power converter. The rate control 107 determines how much power the power input 109 delivers to the data processor 111. For example, the rate control 107 determines the power level for the power input 109 based on the amount of data that is stored in the input buffer 105. The power input 109 delivers power to the data processor 111 accordingly. The data process 111 processes data and then sends data to the output buffer 113. The output buffer 113 transfers data to the register 115. The register 115 output data in accordance with the clock 117 input.

While the power scheme in the system 100 adjusts power according to data dependencies during operation to lower power consumption, such scheme is often adequate. For example, the power requirement and consumption is typically low when data in the buffer 105 is low, and vice versa. Because of the difficulty associated with integrating inductors into an ASIC chip, additional power consumption is often introduced by the power input 109. Moreover, the system 100 generally has poor response time for the adjusting power output level, and such response time often leads to poor energy-saving performance.

It is therefore desirable to have an improved system and method to provide power for ASIC devices. It is to be appreciated that certain embodiments of the present invention provides an improved system and method that provide power for ASIC devices.

Figure 2:
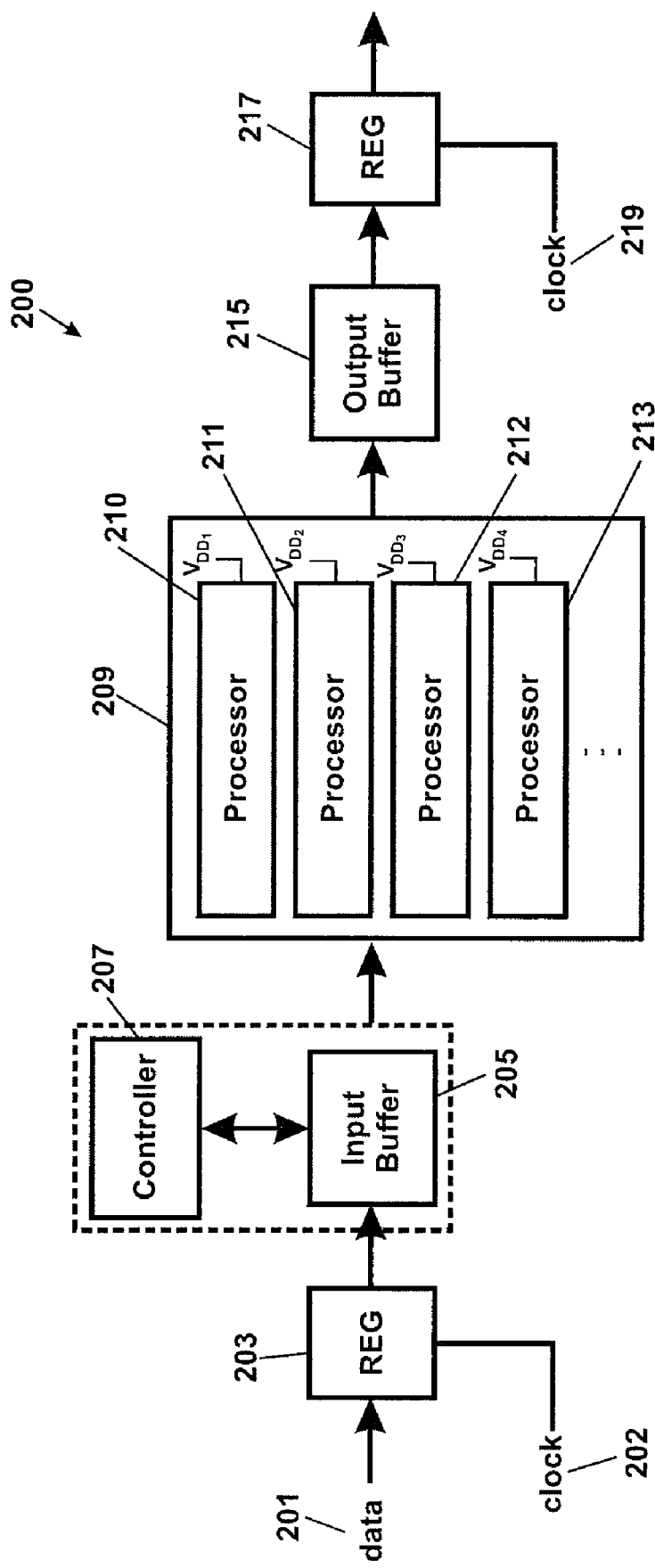
FIG. 2 is a simplified diagram illustrating a power system for ASIC devices according to an embodiment of the present invention.

FIG. 2 is a simplified diagram illustrating a power system for ASIC devices according to an embodiment of the present invention. This diagram is merely an example, which should not unduly limit the scope of the claims. One of ordinary skill in the art would recognize many variations, alternatives, and modifications. The system 200 includes the following components:

1. data input 201;
2. clock 202;
3. register 203;
4. input buffer 205;
5. controller 207;
6. processor 209;
7. output buffer 215;
8. register 217; and
9. clock 219.

Although the above has been shown using a selected group of components for the system 200, there can be many alternatives, modifications, and variations. For example, some of the components may be expanded and/or combined. For example, the controller 207 and the processor 209 are combined according to an embodiment of the present invention. As another example, the processor 209 includes only one processor that is able to select and utilize multiple power level. Other components may be inserted to those noted above. Depending upon the embodiment, the arrangement of components may be interchanged with other replaced. Further details of these components are found throughout the present specification and more particular below.

The register 203 is configured to receive data from the data source 201. According to an embodiment, the register 203 receives data from the data source in accordance with clock input. For example, the clock 202 is a sinusoidal wave with a predetermine frequency and the register 203 receives data segments at the peak of each sinusoidal wave.

The register 203 is connected to the input buffer 205, which is configured to receive data from the register 203 and store data. For example, the input buffer 205 includes random access memory (RAM) to store data.

The input buffer 205 is also connected to a controller 207. The controller 207 is configured to perform a variety of functions. According to an embodiment of the present invention, the controller 207 is configured to generate a control signal that is used to determine the power level to be used to process data. For example, the controller 207 determines the fullness of the input buffer 205. Based on the fullness of the input buffer 205, the controller 207 generate control signal indicating what power level is to be used. For example, the controller 207 generates a signal indicating that high power level is to be used if the input buffer 205 is full. On the other hand, the controller 207 generates a signal indicating that low power level is to be used if the input buffer 205 is empty. Depending upon applications, more than more type of power level signals can be used. For example, the control signal may be used to indicate more than three power levels based on buffer level. Usually if chip area is a concern, two power-levels are enough to reduce power consumption significantly for many applications.

It is to be appreciated that the controller 207, according to certain embodiments of the present invention, is flexible. For example, the controller 207 is configured to determine power output level based on certain conditions. For example, the controller 207 determines the data transfer rates and uses the data transfer rate as a condition for determining the power level output. The controller 207 determines that a high power level is needed when the data transfer rate is higher than a predetermined rate. As another example, the controller 207 determines the type of data that is stored at the input buffer 205. For certain types of data (e.g., multimedia data) that requires more processing power, the controller 207 generates a control signal indicating that a high power level is needed for the purpose of processing data.

Depending upon applications, the controller 207 can be configured to generate control signals for a variety of applications. Optimized power requirement may be stored in a data structure. For example, the controller 207 stores a look up table with optimized power output level as shown in Table 1.

TABLE 1

| Data Type | Data Rate | Power requirement |
|---|---|---|
| Voice | 32 kbits/s | 0.5 |
| Interactive data | 1-100 kbit/s | 0.1 |
| Bulk data | 1-10 Mbit/s | 1-0.1 |
| Standard quality video | 1.5-15 Mbit/s | 0.5-0.33 |
| High definition TV | 15-150 Mbit/s | 1-0.5 |
| Video telephony | 0.2-2 Mbit/s | 0.2 |

Table 1 is only an example and should not unduly limit the scope of claims. For example, the data rate and power requirement vary. Generally, video data rates vary depending upon coding methods. For example, video data rates vary greatly if variable bit rate method is used for encoding the video. The power consumption level would change accordingly. It is to be appreciated that various embodiments of the present invention allows fast response time to dynamically determine power to be used for processing data.

The controller 207 is connected to the processor 209. The controller 207 is configured to send the control signal to the processor 209. The processor 209 selects what power source should be used in response to the control signal received from the controller. According to an embodiment, the processor 209 includes two or more power sources that are electrically coupled to processor to provide power. For example, each of the power sources is a circuit that uses a different supply voltage. As illustrated in FIG. 2, the processor 209 includes processor 210, processor 211, processor 212, and processor 213. Each processor is coupled to a different power source. According to an embodiment, the processor 210 is coupled to a power source with less than 0.2 volt of power while the processor 211 is coupled to a power source that is capable of delivering more than 0.5 volt of power. For example, during operation, the processor 209 selects the processor 210 to process data if the received control signal indicates that low power level is to be used; the processor 209 selects the processor 211 to process data if the received control signal indicates that high power level is to be used. Depending upon application, more or fewer power source may be used. For example, the processor 209 includes six processor, each corresponds to a data type as listed in Table 1 and couples to a different power source.

The processor 209 is connected to the output buffer 215. The output buffer 215 stores processed data from the processor 209 before the register 217 can send processed data out. For example, the register 217 sends data out in accordance with the clock signal 219.

Figure 3:
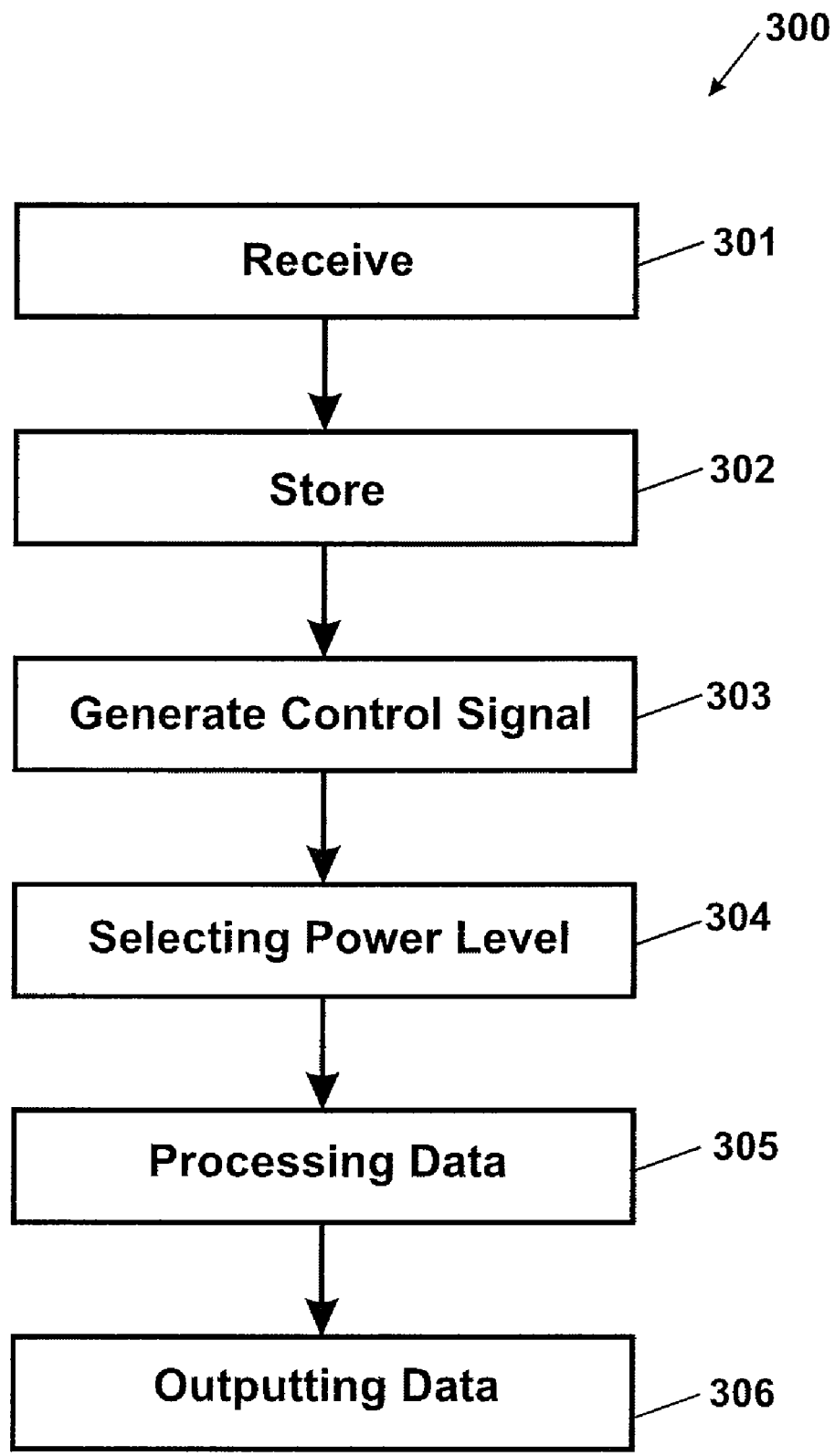
FIG. 3 is a simplified diagram illustrating a method for adjusting power consumption level according to an embodiment of the present invention.

It is to be appreciated that there are various way to implement a power control system for better ASIC device performance according to various embodiments of the present invention. According to an example, various systems can be used to implement a method according to an embodiment of the present invention. FIG. 3 is a simplified diagram illustrating a method for adjusting power consumption level according to an embodiment of the present invention. This diagram is merely an example, which should not unduly limit the scope of the claims. One of ordinary skill in the art would recognize many variations, alternatives, and modifications. Various steps illustrating may be added, removed, replaced, rearranged, repeated, overlapped, or partially overlay. As an example, the method 300 is implement with the system 200.

The system 200 receives data, at step 301. For example, data is received from an external data source. The data is stored, at step 302. According to an embodiment, the data is stored at the input buffer 205. The data stored can be characterized by a first condition. According to an embodiment, the first condition is the fullness of the buffer level at the input buffer. According to another embodiment, the first condition is the data type. According to yet another embodiment, the first condition is a data transfer rate.

The system 200 generates a control signal, at step 303. For example, the control signal is generated by the controller 207. The controller generates the control signal based on the first condition. According to an embodiment, the process of generating control signal includes processing information associated with the first condition and a predetermined condition. For example, if the first condition is higher than the predetermined condition, the control signal represents a first power level. Alternatively, if the first condition is not higher than the predetermined condition, the control signal presents a second power level.

The system 200 selects a power consumption level based on the control signal, at step 304. According to an embodiment, the processor 209 selects a power consumption level based on the control signal. For example, the processor 209 selects a first power consumption level if the control signal represents a first power level. Alternatively, the processor 209 selects a second power consumption level if the control signal represents a second power level. The first power consumption level is higher than the second power consumption level. According to another embodiment, the system 200 averages the data processing power by determining the input buffer behavior.

The system 200 processes the data at the selected power consumption level, at step 305. For example, if the buffer is full, high power consumption is needed to process a large amount of data. It is to be appreciated that by adjusting the voltage level, the system 200 is able to control power consumption, as power consumption is proportional to the square of voltage supply level.

The system outputs the processed data, at step 306. For example, the register 217 outputs processed data in accordance with the clock signal 219.

According to an embodiment, the present invention provides a system for adjusting power consumption of an ASIC device. The system includes a first buffer (e.g., the first buffer is implemented with random access memory and control logic). The first buffer is configured to receive and store data. The system also includes a controller that is configured to generate a control signal. The controller is coupled to the first buffer. The system additionally includes a processing unit coupled to the first buffer. The processing unit includes a first power source and a second power source. The first power source is different from the second power source. The processing unit is configured to receive the control signal from the controller. Additionally, the system includes a second buffer coupled to the processing unit. The second buffer is configured to receive and store processed data. The controller is further configured to process information associated at least with the first buffer level and a first predetermined buffer level. If the first buffer level is higher than the first predetermined buffer level, the control signal represents a first power source signal. Alternatively, if the first buffer level is not higher than a first predetermined buffer level, the control signal represents a second power source signal. The processing unit is further configured to operate with the first power source if the control signal represents the first power signal, and to operate with the second power source if the control signal represents the second power signal. The first power source is associated with a first power consumption level. The second power source is associated with a second power consumption level. For example, the embodiment is illustrated according to FIG. 2.

According to another embodiment, the present invention provides a method for adjusting power consumption of an ASIC device. The method includes step for receiving and storing data. The data is characterized by a first condition (e.g., buffer level, data rate, etc.). The method also includes a step for generating a control signal. The control signal is associated with the first condition. The method additionally includes a step for selecting a power consumption level based on the control signal. Additionally, the method includes a step for processing the data at the selected power consumption level. In addition, the method includes a step for outputting the processed data. The step for generating a control signal further includes a step for processing information associated with the first condition and a predetermined condition. If the first condition is higher than the predetermined condition, the control signal represents a first power level. If the first condition is not higher than the predetermined condition, the control signal presents a second power level. The step of selecting a power consumption level includes a step selecting a first power consumption level if the control signal represents a first power level, and selecting a second power consumption level if the control signal represents a second power level. The first power consumption level is higher than the second power consumption level. For example, the embodiment is illustrated according to FIG. 3.

According to yet another embodiment, the present invention provides a method for adjusting power consumption of an ASIC device. The method includes a step for receiving and storing data. The data is characterized by a first condition. The method also includes a step for generating a control signal. The control signal is associated with the first condition. The method further includes a step for selecting a processing unit based on the control signal. The method additionally includes a step for processing the data using the selected processing unit. Additionally, the method includes a step for outputting the processed data. The step of generating a control signal further includes a step for processing information associated with the first condition and a predetermined condition. If the first condition satisfies the predetermined condition, the control signal represents a first power level. If the first condition does not satisfy the predetermined condition, the control signal presents a second power level. The step for selecting a power consumption level includes a step for selecting a first processing unit if the control signal represents a first power level, and selecting a second processing unit if the control signal represents a second power level. The first processing unit is different from the second processing unit. For example, the embodiment is illustrated according to FIG. 3.

According to yet another embodiment, the present invention provides a system for adjusting power consumption of an ASIC device. The system includes a first buffer, which configured to receive and store data. The data is characterized by a first condition. The system further includes a controller configured to generate a control signal. The system also includes a processing unit coupled to the first buffer. The processing unit including a first power source and a second power source, the first power source being different from the second power source, the processing unit being configured to receive the control signal from the controller. The system additionally includes a second buffer coupled to the processing unit. The second buffer is configured to receive and store processed data. The controller is further configured to process information associated at least with the first condition, a first predetermine condition, and a second predetermined condition. If the first condition satisfies the first predetermined condition, the control signal represents a first power source signal. If the second condition satisfies the second predetermined condition, the control signal represents a first power source signal. The processing unit is further configured to operate with the first power source if the control signal represents the first power signal, and to operate with the second power source if the control signal represents the second power signal. The first power source is associated with a first power consumption level. The second power source is associated with a second power consumption level. The first predetermined condition is different from the second predetermined condition. For example, the embodiment is illustrated according to FIG. 3. The embodiment may be implement with system 200.

Figure 4:
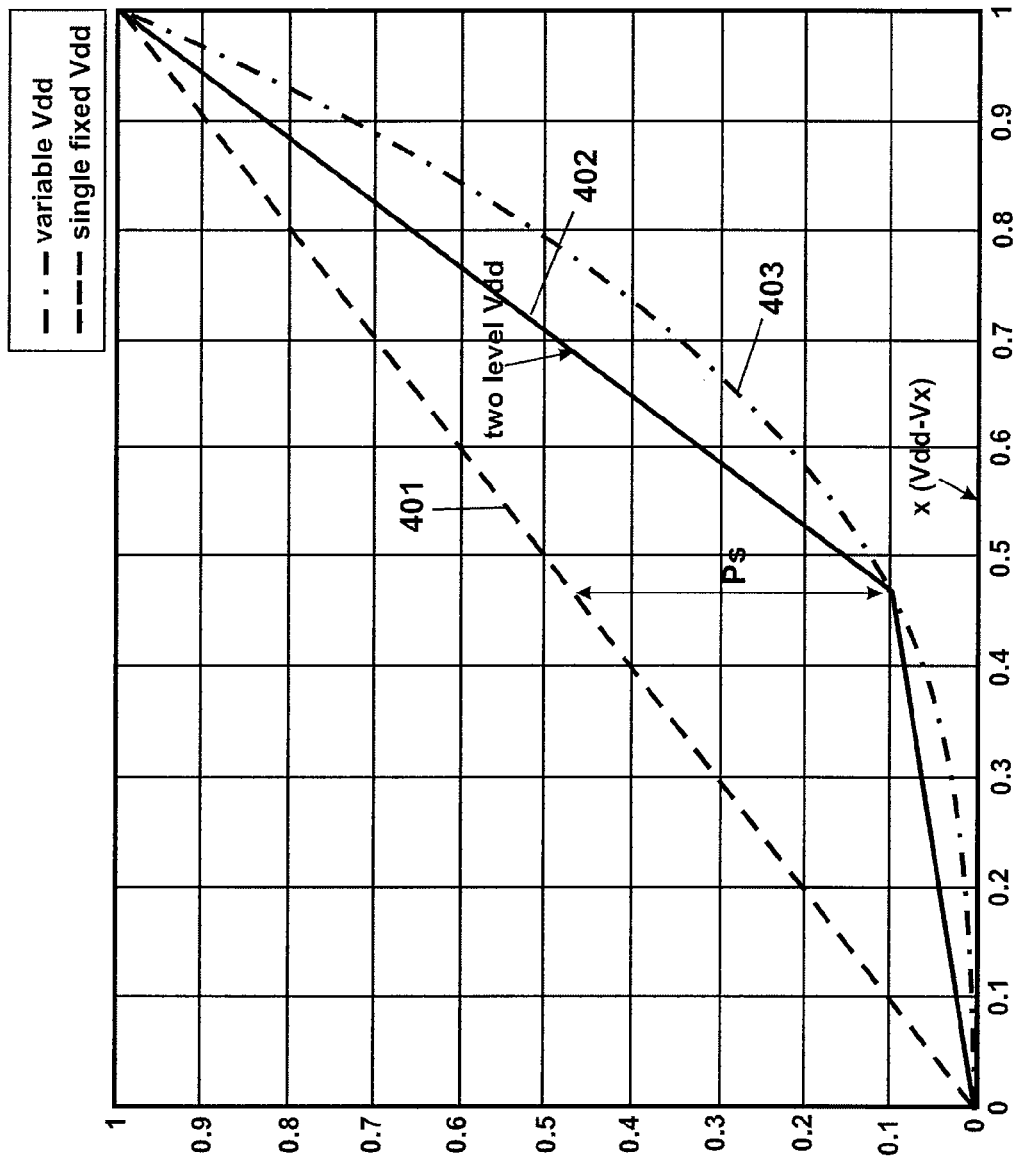
FIG. 4 is a simplified diagram illustrating the power consumption of an embodiment of the present invention.

It is to be appreciated that the present invention provides an improved system and method for providing power for ASIC devices. According to certain embodiments, the present invention reduces power consumption and improves power efficiency for ASIC devices. Depending upon application, the present lowers power consumption and prolongs battery usage for portable devices that utilize ASIC devices. For certain applications, the present invention lowers heat dissipation by adjusting power used by ASIC devices. For example, low power is used when ASIC devices is not busy. Certain embodiments of the present invention utilize a controller to provide control signal for adjusting the operation power of ASIC devices. To illustrate the improvement offered by the present invention, FIG. 4 is shown. FIG. 4 is a simplified diagram illustrating the power consumption of an embodiment of the present invention. This diagram is merely an example, which should not unduly limit the scope of the claims. One of ordinary skill in the art would recognize many variations, alternatives, and modifications.

As shown in FIG. 4, curve 402 illustrating power consumption level of an embodiment according to the present invention utilizes less power than a convention system as illustrated by curve 401. The graph depicts the normalized power consumption levels versus data rate, which is based on average data rate for three different scenarios. The curve 401 illustrates the power consumption for a fixed Vdd (single power supply). The curve 402 illustrates the reduced power consumption for an embodiment of the present invention utilizing two power sources. The curve 403 illustrates variable Vdd for an ideal DC-DC converter.

Depending upon application, the present invention also provides better flexibility for power control and implementation. For example, more power levels can be implemented to save more dynamic energy. However, circuit area becomes bigger as more power levels are implemented. It is therefore important to note that two-level power supply system can reduce dynamic power consumption It is understood the examples and embodiments described herein are for illustrative purposes only and that various modifications or changes in light thereof will be suggested to persons skilled in the art and are to be included within the spirit and purview of this application and scope of the appended claims.

What is claimed is:

1. A system for adjusting power consumption of an application specific integrated circuit (ASIC) device, the system comprising:
   a first buffer, the first buffer being configured to receive and store data, the first buffer being characterized by a first buffer level;
   a controller configured to generate a control signal, the controller being coupled to the first buffer;
   a processing unit coupled to the first buffer, the processing unit including a first power source and a second power source, the first power source being different from the second power source, the processing unit being configured to receive the control signal from the controller, the processing unit further being configured to receive the data from the first buffer and to process the data;
   a second buffer coupled to the processing unit, the second buffer being configured to receive and store the processed data;
   wherein:
      the first buffer level is determined by the controller;
      the controller is further configured to process information associated at least with the first buffer level and a first predetermined buffer level;
      if the first buffer level is determined to be higher than the first predetermined buffer level, the control signal indicates a first power source;
      if the first buffer level is determined to be not higher than a first predetermined buffer level, the control signal indicates a second power source;
      the processing unit is further configured to operate with the first power source if the control signal indicates the first power, and to operate with the second power source if the control signal indicates the second power;
      the first power source is associated with a first power consumption level;
      the second power source is associated with a second power consumption level.

2. The system of claim 1 wherein the first power source includes a first circuit.

3. The system of claim 1 wherein the first power source includes a DC power source.

4. The system of claim 1 wherein the first power consumption level is higher than the second power consumption level.

5. A method for adjusting power consumption of an ASIC device, the method comprising:
   receiving and storing data at a first buffer, the first buffer being characterized by a first condition;
   generating a control signal, the control signal being associated with the first condition;
   selecting a power consumption level based on the control signal;

processing the data at the selected power consumption level;
outputting the processed data;
wherein:
the first condition includes a type of data to be processed;
the generating a control signal further comprises processing information associated with the first condition and a predetermined condition;
if the first condition is determined to be higher than the predetermined condition, the control signal indicates a first power level;
if the first condition is determined to be not higher than the predetermined condition, the control signal indicates a second power level;
the selecting a power consumption level comprises selecting a first power consumption level if the control signal indicates a first power level, and selecting a second power consumption level if the control signal indicates a second power level, the first power consumption level being higher than the second power consumption level.

6. The method of claim 5 further comprising synchronizing processed data.

7. The method of claim 5 further comprising averaging a workload.

8. The method of claim 5 wherein the first condition includes a size of data stored.

9. The method of claim 5 wherein the first condition includes a rate of data to be processed.

10. A method for adjusting power consumption of an ASIC device, the method comprising:
receiving and storing data at a first buffer, the first buffer being characterized by a first condition;
generating a control signal, the control signal being associated with the first condition;
selecting a processing unit based on the control signal;
processing the data using the selected processing unit;
outputting the processed data;
wherein:
the generating a control signal further comprises processing information associated with the first condition and a predetermined condition;
if the first condition is determined to satisfies the predetermined condition, the control signal indicates a first power level;
if the first condition is determined not to satisfy the predetermined condition, the control signal indicates a second power level;
the selecting a power consumption level comprises selecting a first processing unit if the control signal indicates a first power level, and selecting a second processing unit if the control signal indicates a second power level, the first processing unit being different from the second processing unit.

11. The method of claim 10 wherein the first processing unit operates at a higher power level than the second processing unit.

12. The method of claim 10 further comprising determining the first condition.

13. The method of claim 10 wherein the first condition includes a buffer level.

14. The method of claim 10 wherein the first condition includes a data type.

15. The method of claim 10 wherein the first condition includes a data transfer rate.

16. A system for adjusting power consumption of an ASIC device, the system comprising:
a first buffer, the first buffer being configured to receive and store data, the first buffer being characterized by a first condition;
a controller configured to generate a control signal, the controller being coupled to the first buffer;
a processing unit coupled to the first buffer, the processing unit including a first power source and a second power source, the first power source being different from the second power source, the processing unit being configured to receive the control signal from the controller, the processing unit further being configured to process receive from the first buffer and process data;
a second buffer coupled to the processing unit, the second buffer being configured to receive and store processed data;
wherein:
the controller is further configured to process information associated at least with the first condition, a first predetermined condition, and a second predetermined condition;
if the first condition is determined to satisfy the first predetermined condition, the control signal represents a first power source signal;
if the second condition is determined to satisfy the second predetermined condition, the control signal represents a first power source signal;
the processing unit is further configured to operate with the first power source if the control signal indicates the first power, and to operate with the second power source if the control signal indicates the second power;
the first power source is associated with a first power consumption level;
the second power source is associated with a second power consumption level;
wherein the first predetermined condition is different from the second predetermined condition.

17. The system of claim 16 wherein the processing unit is further coupled to a third power source.

18. The system of claim 16 wherein the first condition includes data type.

19. The system of claim 16 wherein the first condition includes data transfer rate.

20. The system of claim 16 wherein the first condition includes a buffer level.

21. The system of claim 20 wherein the buffer level is determined by the controller.

22. The system of claim 19 wherein the data transfer rate is determined by the controller.

23. The system of claim 16 wherein the first power source is optimized for processing burst data.

24. The system of claim 16 wherein the second power source is optimized for processing uniform data.

* * * * *